(12) United States Patent
Elgee

(10) Patent No.: US 6,299,275 B1
(45) Date of Patent: Oct. 9, 2001

(54) THERMAL DROP DETECTOR AND METHOD OF THERMAL DROP DETECTION FOR USE IN INKJET PRINTING DEVICES

(75) Inventor: Steven B. Elgee, Portland, OR (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/352,059

(22) Filed: Jul. 14, 1999

(51) Int. Cl.$^7$ ................................ B41J 2/01; G01K 7/00
(52) U.S. Cl. ............................................. 347/19; 374/166
(58) Field of Search .................... 347/17, 19; 374/45, 374/54, 166, 178, 183

(56) References Cited

U.S. PATENT DOCUMENTS

| | | | |
|---|---|---|---|
| 4,656,333 | 4/1987 | Murphy | 219/209 |
| 4,922,268 | 5/1990 | Osborne | 346/140 R |
| 4,922,270 | 5/1990 | Cobbs et al. | 346/140 R |
| 5,036,340 | 7/1991 | Osborne | 346/140 R |
| 5,109,239 | 4/1992 | Cobbs et al. | 346/140 R |
| 5,193,911 | * 3/1993 | Nix et al. | 374/121 |
| 5,261,747 | * 11/1993 | Deacutis et al. | 374/137 |
| 5,346,466 | 9/1994 | Yerlikaya et al. | 604/253 |
| 5,434,430 | 7/1995 | Stewart | 250/573 |
| 5,764,246 | * 6/1998 | Wataya et al. | 347/14 |
| 6,048,046 | * 4/2000 | Saito et al. | 347/19 |
| 6,062,668 | * 5/2000 | Cruz-Uribe | 347/19 |

OTHER PUBLICATIONS

Hewlett–Packard Patent Application "Low Cost Ink Drop Detector"; Filed Oct. 7, 1997; Ser. No. 08/946,190.
Hewlett–Packard Application "Drop Detection Using A Movable Strip"; Filed Apr. 30, 1999; Ser. No. 09/302,610.

* cited by examiner

Primary Examiner—Craig A. Hallacher
(74) Attorney, Agent, or Firm—Erik A. Anderson

(57) ABSTRACT

An embodiment of a thermal drop detector in accordance with the present invention includes an array configured to define a plurality of cells each of which is configured to detect thermal changes in an area of that cell resulting from deposition of a drop adjacent that cell. This embodiment of a thermal drop detector additionally includes a thermally conductive layer over each of the cells to protect each of the cells from physical contact with the drop. A method of thermal drop detection in accordance with the present invention includes depositing a drop on a thermally conductive material, the thermally conductive material overlaying a thermally sensitive array. The method additionally includes measuring via the thermally sensitive array a thermal change resulting from deposition of the drop on the thermally conductive material. The method further includes determining a characteristic of the drop deposited on the thermally conductive material based upon the thermal change measured by the thermally sensitive array. Further characteristics and features of the thermal drop detector and method of thermal drop detection are described herein, as are various exemplary alternative embodiments.

16 Claims, 5 Drawing Sheets

THERMAL DROP DETECTOR AND METHOD OF THERMAL DROP DETECTION FOR USE IN INKJET PRINTING DEVICES

BACKGROUND AND SUMMARY

The present invention relates to a thermal drop detector and method of thermal drop detection for use in inkjet printing devices.

Inkjet printing devices use ink to print text, graphics, images, etc. onto print media. Inkjet printers may use print cartridges, also known as "pens", which shoot drops of printing composition, referred to generally herein as "ink", onto a print medium such as paper or transparencies. Each pen has a printhead that includes a plurality of nozzles. Each nozzle has an orifice through which the ink drops are fired. To print an image, the printhead is propelled back and forth across the page by, for example, a carriage, while shooting drops of ink in a desired pattern as the printhead moves. The particular ink ejection mechanism within the printhead may take on a variety of different forms known to those skilled in the art, such as thermal printhead technology.

In a current thermal system, a barrier layer containing ink channels and vaporization chambers is located between an orifice plate and a substrate layer. This substrate layer typically contains linear arrays of heating elements, such as resistors, which are energized to heat ink within the vaporization chambers. Upon heating, the ink in the vaporization chamber turns into a gaseous state and forces or ejects an ink drop from a orifice associated with the energized resistor. By selectively energizing the resistors as the printhead moves across the page, the ink is expelled in a pattern onto the print media to form a desired image (e.g., picture, chart or text).

Optical drop detect circuits are utilized in inkjet printing devices for a variety of purposes such as verifying the operation of printhead nozzles of an inkjet printhead, determining the relative positions of nozzle arrays of multiple inkjet printheads, and ascertaining the size and location of individual ink drops. Optical drop detect circuits typically include a light sensor, such as a photodiode, which senses the light provided by a light source, such as a light emitting diode (LED). When a drop is present in the light path between the light sensor and the light source, the output of the light sensor changes because the amount of light sensed by the light sensor is reduced by the presence of the ink drop. The output of the light sensor is typically amplified and analyzed to determine whether an ink drop passed through the light path between the light source and the light sensor.

As the pens eject droplets of ink through the printhead nozzle orifices, a certain amount of ink is dispersed within the printing device as aerosol. Print media dust can also be produced within the printing device as the printing device handles print media. This aerosol and dust is contaminant matter that is deposited on the interior surfaces of the printing device, on the pen printheads, and also onto the light source and light sensor of an optical drop detector. The build-up of these contaminants on an optical drop detector reduces the amount of light from the light source that reaches the light sensor. This build-up eventually will cause the optical drop detector to cease to properly operate which can lead to a loss of optical drop detector information. Loss of this information can in turn degrade inkjet printing device output print quality, cause one or more printhead nozzles to fail due to undetected clogging caused by such contaminant matter or dried ink, and shorten the useful life of an inkjet printing device.

Alleviation of these problems would be a desired improvement, thereby maintaining inkjet printing device output print quality, helping prevent printhead nozzle failure, and increasing the useful life of an inkjet printing device. Accordingly, the present invention is directed to solving printing device problems caused by contaminant matter accumulating on printing device optical drop detectors. The present invention accomplishes this objective by providing a thermal drop detector and method of thermal drop detection for use in inkjet printing devices.

An embodiment of the present invention is a thermal drop detector that comprises an array configured to define a plurality of cells each of which is configured to detect thermal changes in an area of that cell resulting from deposition of a drop adjacent that cell. The thermal drop detector additionally comprises a thermally conductive layer over each of the cells to protect each of the cells from physical contact with the drop.

The above-described embodiment of the present invention may be modified and include the following characteristics described below. The array may be configured to define a two-dimensional sheet. Each of the cells may have substantially uniform dimensions.

Each of the cells may be substantially rectangular. In such cases, each of the cells may have an area substantially equal to twenty-five (25) square microns.

The thermally conductive layer may be a one-piece structure. Each cell may include an electrical element. The thermal drop detector may be used in a printing device.

An alternative embodiment of a thermal drop detector in accordance with the present invention comprises a substrate including a plurality of thermally sensitive areas each of which includes an electrical element configured to detect thermal changes resulting from deposition of a drop adjacent that area. The thermal drop detector additionally comprises a thermally conductive layer over each of the areas to protect each of the areas from physical contact with the drop.

The above-described embodiment of a thermal drop detector of the present invention may be modified and include the following characteristics described below. The electrical element may include a diode or a thermistor.

The substrate may include a thermistor. Each of the areas may have substantially uniform dimensions.

Each of the areas may be substantially rectangular. In such cases, each of the cells may have an area substantially equal to twenty-five (25) square microns.

The thermally conductive layer may be a one-piece structure. The thermal drop detector may be used in a printing device.

Yet another alternative embodiment of a thermal drop detector in accordance with the present invention comprises structure for measuring a thermal change resulting from deposition of a drop on a thermally conductive material and structure for determining a characteristic of the drop deposited on the thermally conductive material based upon a thermal change recorded by the structure for measuring.

The above-described embodiment of a thermal drop detector of the present invention may be modified and include the characteristics as described herein. Additionally, the thermal drop detector may be used in a printing device.

An embodiment of a method of thermal drop detection in accordance with the present invention comprises depositing a drop on a thermally conductive material, the thermally conductive material overlaying a thermally sensitive array. The method additionally comprises measuring via the thermally sensitive array a thermal change resulting from deposition of the drop on the thermally conductive material. The method further comprises determining a characteristic of the drop deposited on the thermally conductive material based upon the thermal change measured by the thermally sensitive array.

The above-described embodiment of a method of thermal drop detection in accordance with the present invention may be modified and include the following characteristics described below. The method may further comprise cleaning the thermally conductive material to remove the deposited drop therefrom. The method may further comprise protecting the thermally sensitive array from physical contact with the deposited drop via the thermally conductive material.

Determining a characteristic of the drop deposited on the thermally conductive material based upon the thermal change measured by the thermally sensitive array may include determining a size of the drop, determining a volume of the drop, or determining a location of the drop. The method of may be used in a printing device.

Measuring via the thermally sensitive array a thermal change resulting from deposition of the drop on the thermally conductive material may include generating an electrical signal via an electrical element of the thermally sensitive array that is related to the thermal change.

Other objects, advantages, and novel features of the present invention will become apparent from the following detailed description of the invention when considered in conjunction with the accompanying drawings.

DETAILED DESCRIPTION OF THE DRAWINGS

Figure 1:
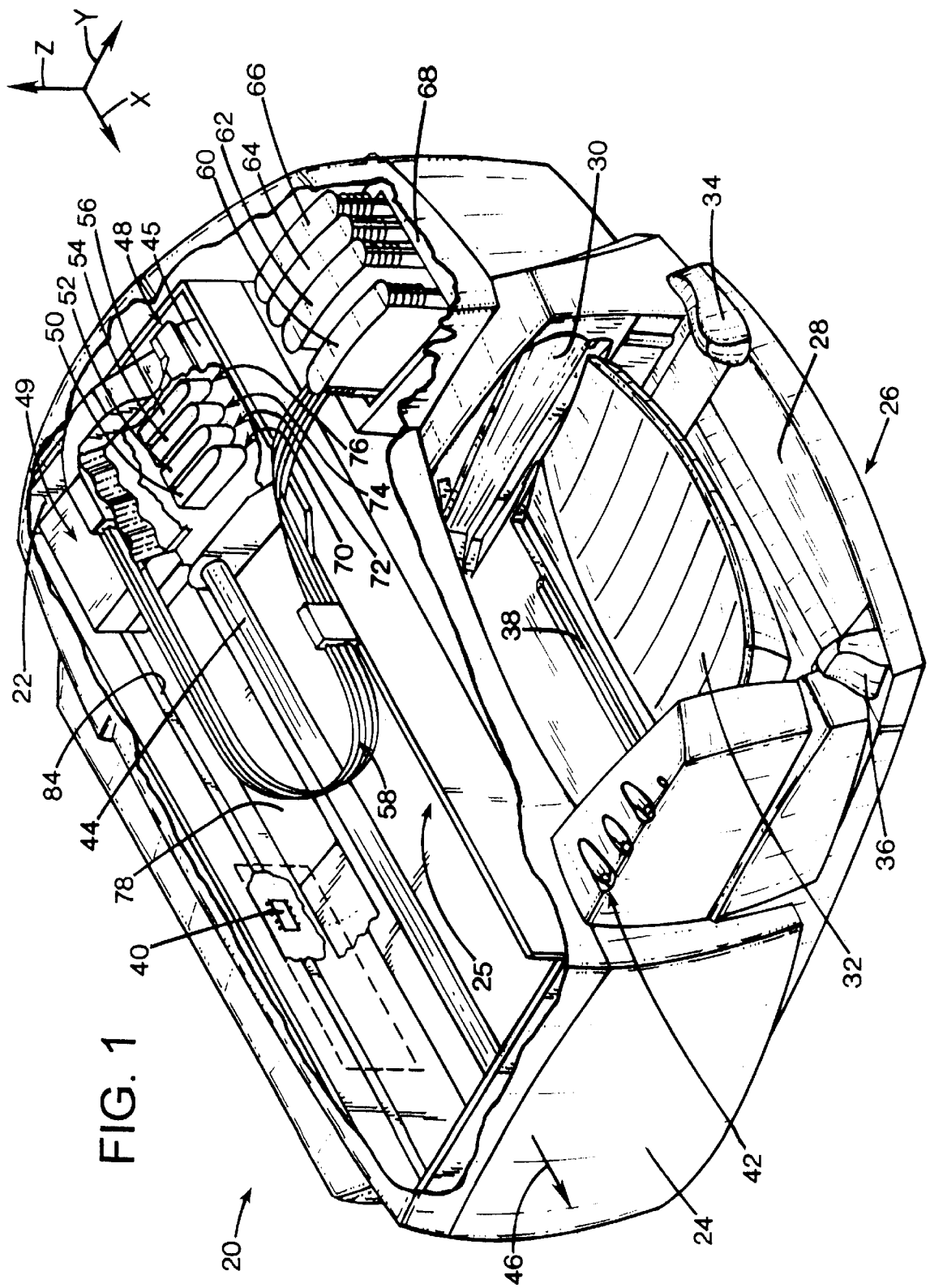
FIG. 1 is a perspective view of a printing device that includes an embodiment of the present invention.

FIG. 1 illustrates an embodiment of an inkjet printing device 20, here shown as an "off-axis" inkjet printer, constructed in accordance with the present invention, which may be used for printing business reports, correspondence, desktop publishing, and the like, in an industrial, office, home or other environment. A variety of inkjet printing devices are commercially available. For instance, some of the printing devices that may embody the present invention include plotters, portable printing units, copiers, cameras, video printers, and facsimile machines, to name a few, as well as various combination devices, such as a combination facsimile and printer. For convenience, the concepts of the present invention are illustrated in the environment of inkjet printer 20.

While it is apparent that the printing device components may vary from model to model, the typical inkjet printer 20 includes a frame or chassis 22 surrounded by a housing, casing or enclosure 24, typically made of a plastic material. Sheets of print media are fed through a printzone 25 by a print media handling system 26. The print media may be any type of suitable material, such as paper, card-stock, transparencies, photographic paper, fabric, metalized media, and the like. Print media handling system 26 has an input supply feed tray 28 for storing sheets of print media before printing. A series of conventional print media drive rollers (not shown) driven by a direct current (dc) motor and drive gear assembly (both of which are not shown) may be used to move the print media from feed tray 28, through printzone 25, and, after printing, onto a pair of extendable output drying wing members 30, shown in a retracted or rest position in FIG. 1. Wings 30 momentarily hold a newly printed sheet of print media above any previously printed sheets still drying in an output tray portion 32, then wings 30 retract to the sides to drop the newly printed sheet into output tray 32. Print media handling system 26 may include a series of adjustment mechanisms for accommodating different sizes of print media, including letter, legal, A-4, envelopes, etc., such as a sliding length adjustment lever 34, a sliding width adjustment lever 36, and an envelope feed port 38. Although not shown, it is to be understood that print media handling system 26 may also include other items such as one or more additional print media feed trays. Additionally, media handling system 26 and printing device 20 may be configured to support specific printing tasks such as duplex printing (i.e., printing on both sides of a sheet of print media) and banner printing.

Printing device 20 also has a printer controller 40, illustrated schematically as a microprocessor, that receives instructions from a host device, typically a computer, such as a personal computer (not shown). Many of the printer controller functions may be performed by the host computer, including any printing device drivers resident on the host computer, by electronics on board the printer, or by interactions between the host computer and the electronics. As used herein, the term "printer controller 40" encompasses these functions, whether performed by the host computer, the printer, an intermediary device between the host computer and printer, or by combined interaction of such elements. Printer controller 40 may also operate in response to user inputs provided through a key pad 42 located on the exterior of casing 24. A monitor (not shown) coupled to the computer host may be used to display visual information to an operator, such as the printer status or a particular program being run on the host computer. Personal computers, input devices, such as a keyboard and/or a mouse device, and monitors are all well known to those skilled in the art.

A carriage guide rod 44 is supported by chassis 22 to slidably support an off-axis inkjet pen carriage system 45 for travel back and forth across printzone 25 along a scanning axis 46. As can be seen in FIG. 1, scanning axis 46 is substantially parallel to an X-axis of the XYZ coordinate system shown in FIG. 1. It should be noted that the use of the word substantially in this document is used to account for things such as engineering and manufacturing tolerances, as well as variations not affecting performance of the present invention. Carriage 45 is also propelled along guide rod 44 into a servicing region, as indicated generally by arrow 48, located within the interior of housing 24. A conventional carriage drive gear and dc (direct current) motor assembly (both of which are not shown) may be coupled to drive an endless loop, which may be secured in a conventional manner to carriage 45, with the dc motor operating in response to control signals received from controller 40 to incrementally advance carriage 45 along guide rod 44 in response to rotation of the dc motor.

In printzone 25, a print media sheet receives ink from an inkjet cartridge, such as black ink cartridge 50 and three monochrome color ink cartridges 52, 54, and 56. Cartridges 50, 52, 54, and 56 are also often called "pens" by those in the art. Pens 50, 52, 54, and 56 each include small reservoirs for storing a supply of printing composition, referred to generally herein as "ink" in what is known as an "off-axis" ink delivery system, which is in contrast to a replaceable ink cartridge system where each pen has a reservoir that carries the entire ink supply as the printhead reciprocates over printzone 25 along scan axis 46. The replaceable ink cartridge system may be considered an "on-axis" system, whereas systems which store the main ink supply at a stationary location remote from the printzone scanning axis are called "off-axis" systems. It should be noted that the present invention is operable in both off-axis and on-axis systems.

In the illustrated off-axis printer 20, ink of each color for each printhead is delivered via a conduit or tubing system 58 from a group of main ink reservoirs 60, 62, 64, and 66 to the on-board reservoirs of respective pens 50, 52, 54, and 56. Stationary ink reservoirs 60, 62, 64, and 66 are replaceable ink supplies stored in a receptacle 68 supported by printer chassis 22. Each of pens 50, 52, 54, and 56 has a respective printhead, as generally indicated by arrows 70, 72, 74, and 76, which selectively ejects ink to from an image on a sheet of print media in printzone 25.

Printheads 70, 72, 74, and 76 each have an orifice plate with a plurality of nozzles formed therethrough in a manner well known to those skilled in the art. The illustrated printheads 70, 72, 74, and 76 are thermal inkjet printheads, although other types of printheads may be used, such as piezoelectric printheads. Thermal printheads 70, 72, 74, and 76 typically include a plurality of resistors which are associated with the nozzles. Upon energizing a selected resistor, a bubble of gas is formed which ejects a droplet of ink from the nozzle onto a sheet of print media in printzone 25 under the nozzle. The printhead resistors are selectively energized in response to firing command control signals delivered by a multi-conductor strip 78 (a portion of which is shown in FIG. 1) from the controller 40 to printhead carriage 45.

To provide carriage positional feedback information to printer controller 40, a conventional optical encoder strip 84 extends along the length of the printzone 25 and over the area of service station 49, with a conventional optical encoder reader being mounted on a back surface of printhead carriage 45 to read positional information provided by encoder strip 84. Printer 20 uses optical encoder strip 84 and the optical encoder reader (not shown) to trigger the firing of printheads 70, 72, 74, and 76, as well as to provide feedback for position and velocity of carriage 45. Optical encoder strip 84 may be made from things such as photo imaged MYLAR brand film, and works with a light source and a light detector (both of which are not shown) of the optical encoder reader. The light source directs light through strip 84 which is received by the light detector and converted into an electrical signal which is used by controller 40 of printing device 20 to control firing of printheads 70, 72, 74, and 76, as well as carriage 45 position and velocity. Markings or indicia on encoder strip 84 periodically block this light from the light detector in a predetermined manner which results in a corresponding change in the electrical signal from the detector. The manner of providing positional feedback information via optical encoder reader may be accomplished in a variety of different ways known to those skilled in the art.

Optical drop detect circuits are utilized in inkjet printing devices for a variety of purposes such as verifying the operation of printhead nozzles of an inkjet printhead, determining the relative positions of nozzle arrays of multiple inkjet printheads, and ascertaining the size and location of individual ink drops. Optical drop detect circuits typically include a light sensor, such as a photodiode, which senses the light provided by a light source, such as a light emitting diode (LED). When a drop is present in the light path between the light sensor and the light source, the output of the light sensor changes because the amount of light sensed by the light sensor is reduced by the presence of the ink drop. The output of the light sensor is typically amplified and analyzed to determine whether an ink drop passed through the light path between the light source and the light sensor.

As the pens eject droplets of ink through the printhead nozzle orifices, a certain amount of ink is dispersed within the printing device as aerosol. Print media dust can also be produced within the printing device as the printing device handles print media. This aerosol and dust is contaminant matter that is deposited on the interior surfaces of the printing device, on the pen printheads, and also onto the light source and light sensor of an optical drop detector. The build-up of these contaminants on an optical drop detector reduces the amount of light from the light source that reaches the light sensor. This build-up eventually will cause the optical drop detector to cease to properly operate which can lead to a loss of optical drop detector information. Loss of this information can in turn degrade inkjet printing device output print quality, cause one or more printhead nozzles to fail due to clogging caused by such contaminant matter and dried ink, and shorten the useful life of an inkjet printing device.

Alleviation of these problems would be a desired improvement, thereby maintaining inkjet printing device output print quality, helping prevent printhead nozzle failure, and increasing the useful life of an inkjet printing device. Accordingly, the present invention is directed to solving printing device problems caused by contaminant matter accumulating on printing device optical drop detectors. The present invention accomplishes this objective by providing a thermal drop detector and method of thermal drop detection for use in inkjet printing devices.

Figure 2:
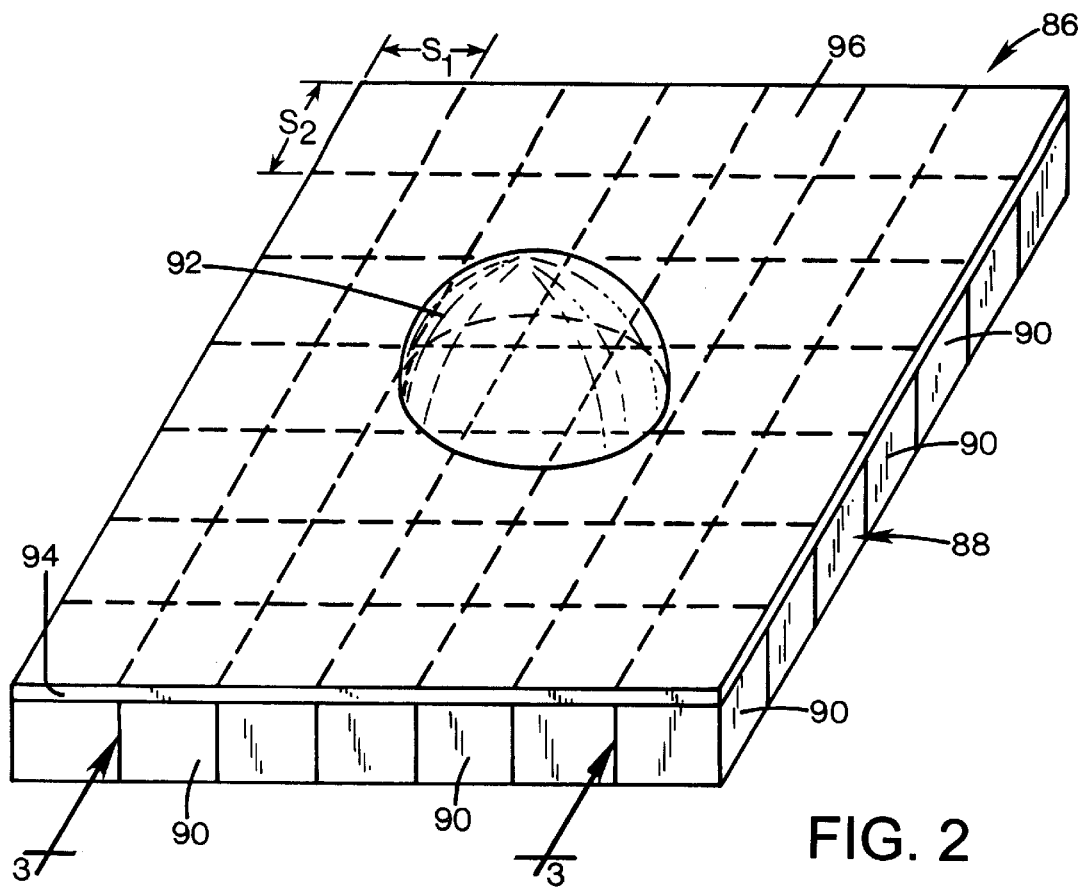
FIG. 2 is a perspective view of an embodiment of a thermal drop detector in accordance with the present invention.

An embodiment of a thermal ink drop detector 86 constructed in accordance with the present invention is shown in FIG. 2. Thermal ink drop detector 86 may be positioned in a variety of locations in inkjet printing device 20, such as service station 49.

As can be seen in FIG. 2, thermal ink drop detector 86 includes a substrate 88 having a plurality of thermally sensitive areas or cells 90 each of which is configured to detect thermal changes in an area of that cell resulting from deposition of a drop, such as ink drop 92 from an inkjet printhead, adjacent that area or cell 90. As can also be seen in FIG. 2, cells 90 are arranged to define a two-dimensional array or coordinate grid that allows the position of drop 92 on detector 86 to be determined based on which cells of this array or grid drop 92 is adjacent, as more fully discussed below.

In the embodiment of the present invention shown in FIG. 2, each of cells 90 is substantially rectangular. In addition, each of cells 90 has substantially uniform dimensions of $S_1$ and $S_2$ which represent the dimensions of the sides of cells 90. Although the dimensions $S_1$ and $S_2$ may vary, in at least one embodiment of the present invention, dimensions $S_1$ and $S_2$ are chosen so that the area of cells 90 is substantially equal to twenty-five (25) square microns.

As can further be seen in FIG. 2, thermal ink drop detector 86 also includes a thermally conductive layer 94 over each of areas or cells 90 to protect each of areas or cells 90 from physical contact with drop 92. Thermally conductive layer 94 may be a one-piece structure as shown in FIG. 2 or may be formed from separate pieces. Such separate pieces may each cover one or more of areas or cells 90.

Unlike conventional optical drop detectors, thermally conductive layer 94 is configured to be easily cleaned of ink and other debris such as dust. Such cleaning may be periodically performed through any of a variety of means such as wiping, scraping, or spraying with a cleaner. Additionally, in one or more embodiments of the present invention, thermally conductive layer 94 is configured to transfer thermal changes due to the presence of one or more ink drops even when uncleaned with a layer of ink and debris build-up on its first surface 96.

Substrate 88 may be formed from any of variety of materials that are sensitive to thermal change. Various possible embodiments of substrate 88 in accordance with the present invention are discussed below in connection with FIGS. 4, 5, and 6. Thermally conductive layer 94 may be formed from any of a variety of materials that are both thermally conductive and robust to cleaning. One possible such material is tungsten.

Figure 3:
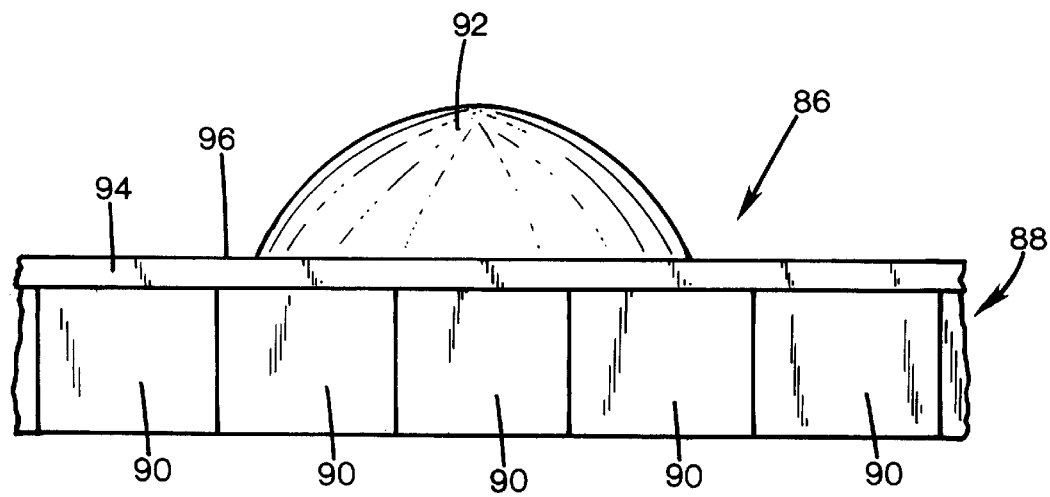
FIG. 3 is a partial side view of the embodiment of the thermal drop detector shown in FIG. 2 taken in the direction of arrows 3—3 in FIG. 2.

Operation of thermal ink drop detector 86 is illustrated in a partial side view of detector 86 in FIG. 3 which is a view taken in the direction of arrows 3—3 in FIG. 2. As can be seen in FIG. 3, drop 92 is deposited on first surface 96 of thermally conductive layer 94. Drop 92 is deposited on first surface 96 at a given temperature which is different than the temperate at first surface 96 without drop 92. Deposition of drop 92 on first surface 96 thus causes a thermal change in an area of first surface 96 over which drop 92 lies. This thermal change is conducted by layer 94 to areas or cells 90 of substrate 88 that are adjacent drop 92. As discussed above, each these areas or cells 90 are each configured to detect thermal changes in the area of that cell. Thus, the size, volume, and location of individual drops may be determined to an accuracy of at least an area encompassed by those cells 90 over which drop 92 lies.

For example, referring to FIGS. 2 and 3, thermal ink drop detector 86 can determine that drop 92 is located substantially at its center and that drop 92 occupies an area approximately encompassed by nine (9) of its cells 90. Increased resolution is possible by decreasing the size of each of areas or cells 90.

Figure 4:
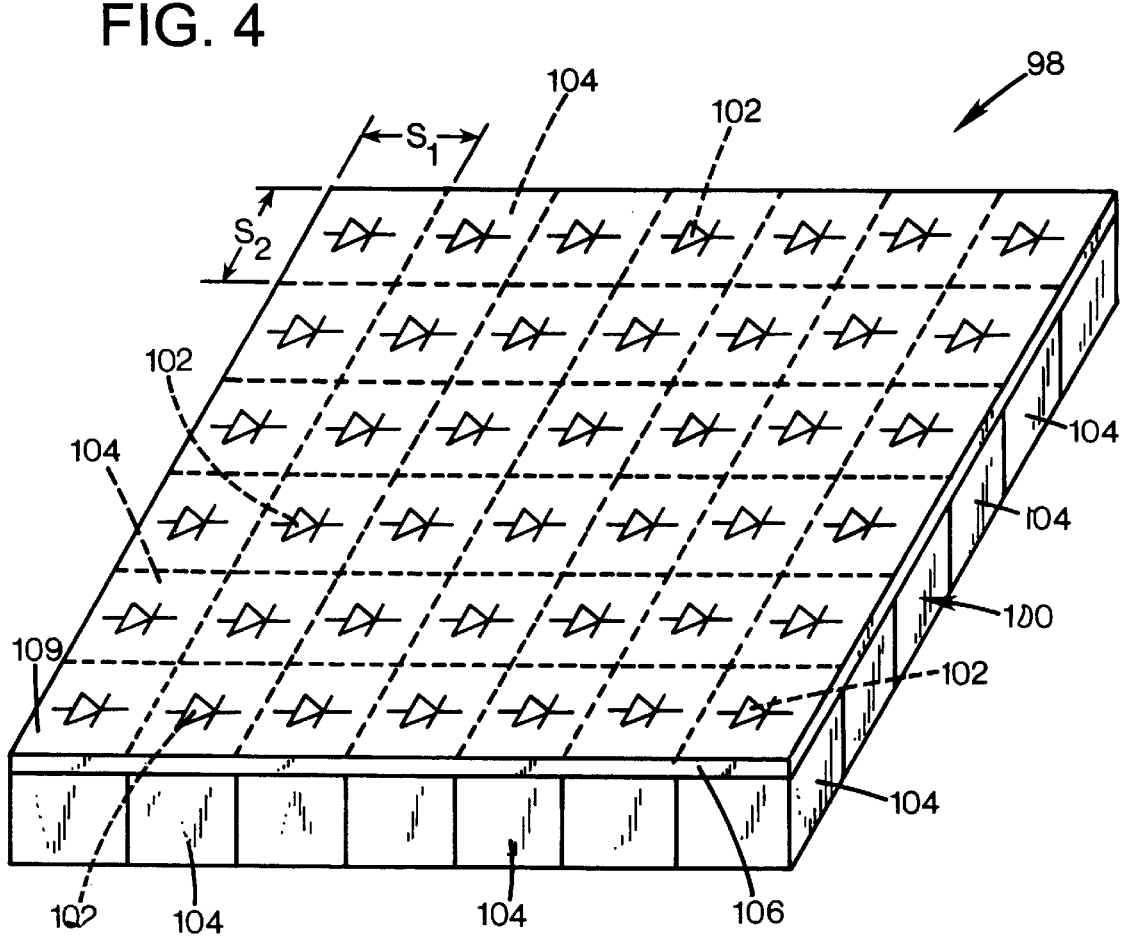
FIG. 4 is a perspective view of an embodiment of a thermal drop detector in accordance with the present invention that includes a plurality of diodes.
Figure 5:
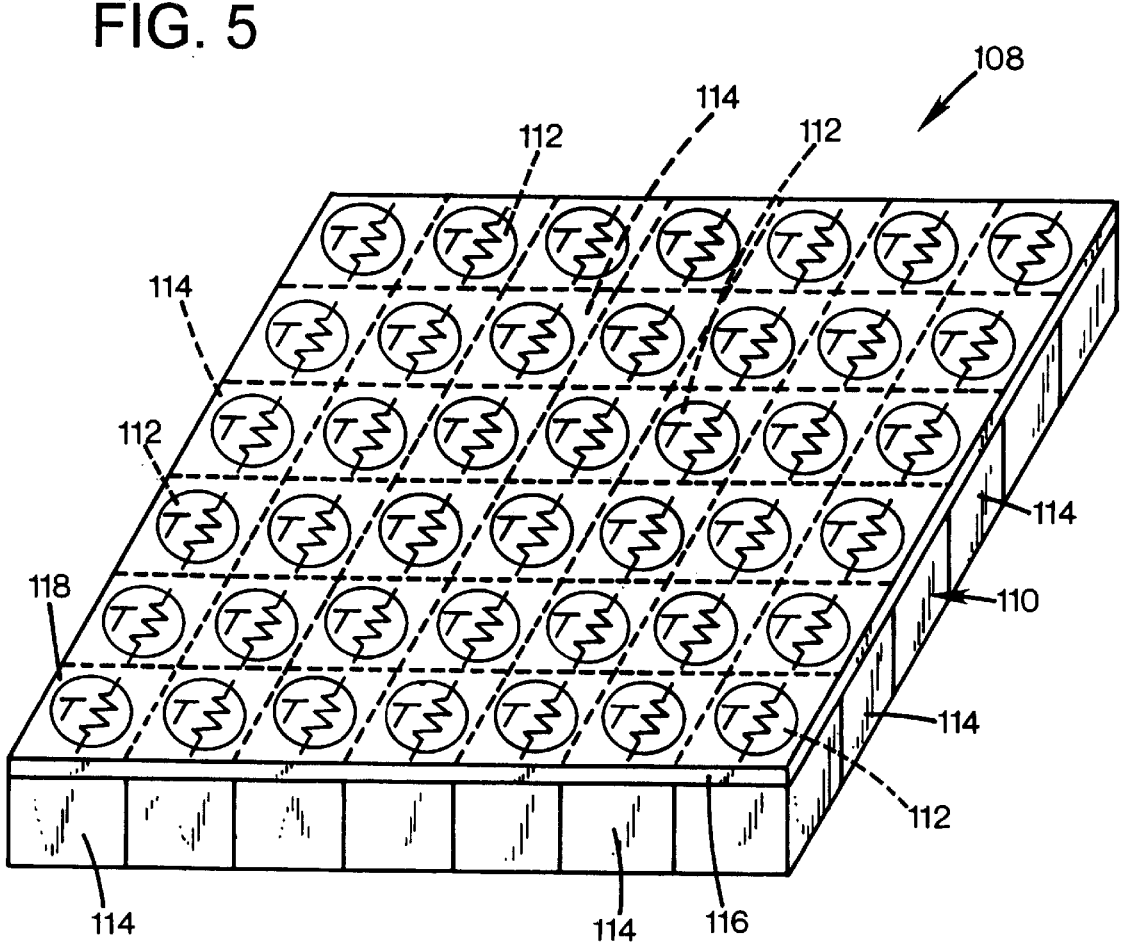
FIG. 5 is a perspective view of an embodiment of a thermal drop detector in accordance with the present invention that includes a plurality of thermistors.

As discussed above, the substrate of the thermal drop detector of the present invention may be constructed in a variety of different ways, two of which are illustrated in FIGS. 4 and 5. In the embodiment of a thermal ink drop detector 98 shown in FIG. 4, substrate 100 is formed to include a plurality of diodes 102 each of which is positioned in an area or cell 104 and each of which is configured to detect thermal changes resulting from deposition of a drop adjacent that cell or area 104. Such thermal changes affect the electrical characteristics of each of diodes 102 in a manner which produces an electrical signal related to such thermal change. This electrical signal can be evaluated by signal processing electronics, as illustrated and discussed more fully below in connection with FIG. 6.

Detector 98 additionally includes a thermally conductive layer 106 over each of areas or cells 104 that protects areas or cells 104 from physical contact with drops. Layer 106 also conducts thermal changes occurring at first surface 109 of layer 106 to areas or cells 104 of substrate 100, as discussed above in connection with layer 94.

In the embodiment of a thermal ink drop detector 108 shown in FIG. 5, substrate 110 is formed to include a plurality of thermistors 112 each of which is positioned in an area or cell 114 and each of which is configured to detect thermal changes resulting from deposition of a drop adjacent that cell or area 114. Such thermal changes affect the resistance of each of thermistors 112 in a manner which produces an electrical signal related to such thermal change. This electrical signal can be evaluated by signal processing electronics, as illustrated and discussed more fully below in connection with FIG. 6.

Detector 108 additionally includes a thermally conductive layer 116 over each of areas or cells 114 that protects areas or cells 114 from physical contact with drops. Layer 116 also conducts thermal changes occurring at first surface 118 of layer 116 to areas or cells 114 of substrate 110, as discussed above in connection with layer 94.

Figure 6:
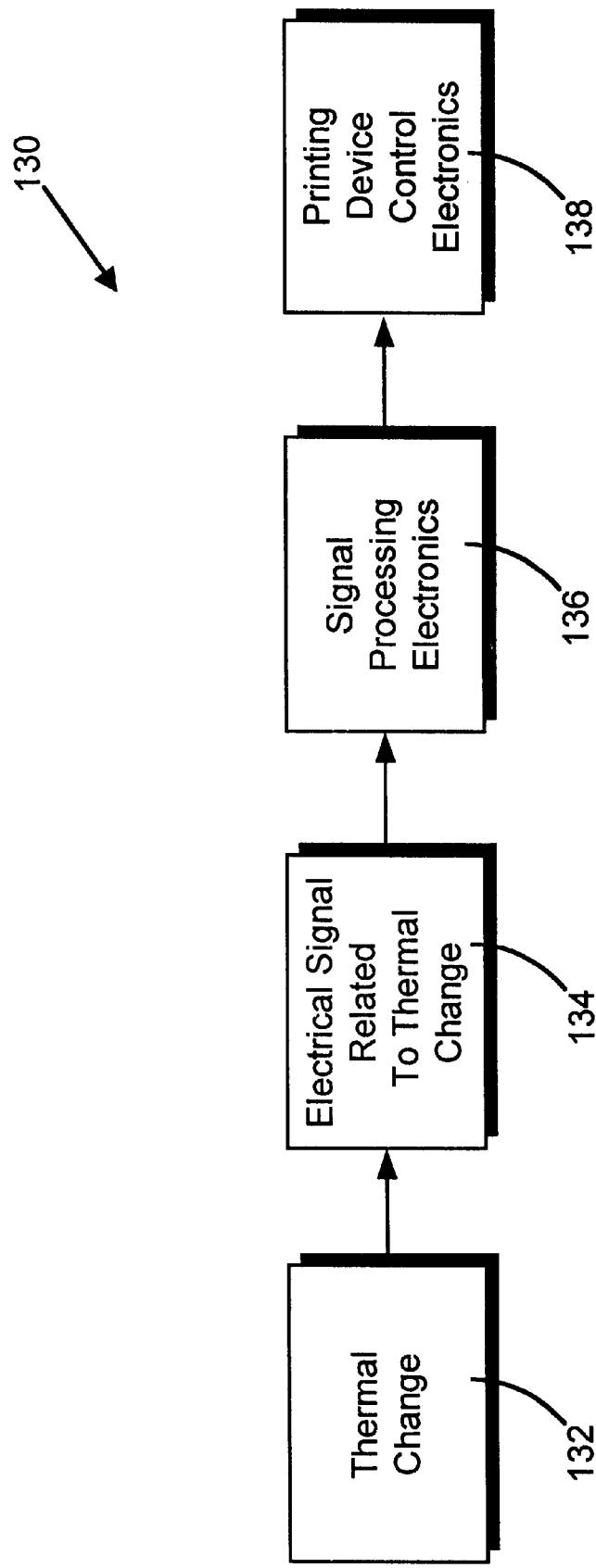
FIG. 6 is an illustrative block diagram embodiment of a system in accordance with the present invention for use with the thermal drop detector of the present invention.

An illustrative block diagram embodiment of a system 130 in accordance with the present invention for use with the thermal drop detector of the present invention is shown in FIG. 6. As can be seen in FIG. 6, system 130 includes a thermal change module 132 that detects thermal changes resulting from deposition of one or more drops on a first surface of a thermally conductive layer of a drop detector of the present invention. System 130 also includes a module 134 that produces an electrical signal related to the thermal change detected by module 132. Models 132 and 134 may together constitute a thermal drop detector in accordance with the present invention.

As can also be seen in FIG. 6, system 130 additionally includes a module 136 that includes signal processing electronics which receive the electrical signal from module 134. Module 136 may include a variety of components, such as filter, analog-to-digital conversion, amplifier, and microprocessor circuits, that analyze the electrical signal from module 134 to determine various characteristics of a drop such as its location, size, volume, etc. Module 136 may also convert the electrical signal from module 134 into one or more signals transmitted to module 138 which includes printing device control electronics, such as controller 40, for controlling operation of printing device 20 based on these signals, such as initiating an unscheduled printhead servicing routine by service station 49 to unclog printhead nozzles, adjusting printmodes, or cleaning the surface of the thermally conductive layer.

Although the invention has been described and illustrated in detail, it is to be clearly understood that the same is intended by way of illustration and example only, and is not to be taken necessarily, unless otherwise stated, as an express limitation. For example, the thermally sensitive areas or cells may have differing dimensions, rather than being substantially uniform. As another example, one or more of the thermally sensitive areas or cells of a thermal drop detector may configured to be nonrectangular and instead be substantially circular, substantially oval, substantially triangular, substantially hexagonal, etc. The spirit and scope of the present invention are to be limited only by the terms of the following claims.

What is claimed is:

1. A thermal drop detector, comprising:
an array configured to define a plurality of cells each of which is configured to detect thermal changes in an area of that cell resulting from deposition of a drop adjacent that cell;
the cells being arranged so that two or more cells extend in each of two different directions thereby to define a two-dimensional coordinate grid; and a thermally conductive layer over each of the cells to protect each of the cells from physical contact with the drop.

2. The thermal drop detector of claim 1, wherein the array is configured so that each of the cells detects thermal changes thereby to enable a determination of the size and volume of the drop as well as the location of the drop relative to the cells of the drop detector.

3. The thermal drop detector of claim 1, wherein each of the cells has substantially uniform dimensions and is sized relative to the drop so that a single drop contacts more than a single cell.

4. The thermal drop detector of claim 1, wherein each of the cells is substantially rectangular.

5. The thermal drop detector of claim 4, wherein each of the cells has an area substantially equal to twenty-five (25) square microns.

6. The thermal drop detector of claim 1, wherein the thermally conductive layer is a one-piece structure.

7. The thermal drop detector of claim 1, wherein each cell includes an electrical element.

8. The thermal drop detector of claim 7, wherein the electrical element includes one of a diode and a themistor.

9. A printing device comprising the thermal drop detector as recited in claim 1.

10. A method of thermal drop detection, comprising:

arranging a thermally sensitive array of cells in a two-dimensional coordinate grid of cells;

depositing a drop on a thermally conductive material, the thermally conductive material overlaying a portion of the thermally sensitive array;

measuring for each cell in the thermally sensitive array a thermal change resulting from deposition of the drop on the thermally conductive material; and determining a characteristic of the drop deposited on the thermally conductive material based upon the thermal changes measured by the thermally sensitive array.

11. The method of claim 10, further comprising periodically cleaning the thermally conductive material to remove the deposited drop therefrom.

12. The method of claim 10, further comprising protecting the thermally sensitive array from physical contact with the deposited drop via the thermally conductive material.

13. The method of claim 10, wherein determining a characteristic of the drop deposited on the thermally conductive material based upon the thermal changes measured by the thermally sensitive array includes at least one of determining a size of the drop, determining a volume of the drop, and determining a location of the drop.

14. The method of claim 10, wherein measuring via the thermally sensitive array a thermal change resulting from deposition of the drop on the thermally conductive material includes generating an electrical signal via electrical elements, each of the elements being separately associated with each cell of the thermally sensitive array that is related to the thermal change.

15. A thermal drop detector, comprising:

means for measuring a thermal change resulting from deposition of a drop on a thermally conductive material; and means for determining the location, size and volume of the drop in two dimensions, thereby to determine a characteristic of the drop deposited on the thermally conductive material based upon a thermal change recorded by the means for measuring.

16. A printing device comprising the thermal drop detector as recited in claim 15.

* * * * *